United States Patent [19]

Nakamichi

[11] Patent Number: 5,504,733
[45] Date of Patent: Apr. 2, 1996

[54] DISK PLAYER WITH CARRIAGE AND TRAY TRANSPORT MECHANISM

[75] Inventor: Niro Nakamichi, Rancho Palos Verdes, Calif.

[73] Assignee: Nakamichi Corporation, Tokyo, Japan

[21] Appl. No.: 206,509

[22] Filed: Mar. 4, 1994

[30] Foreign Application Priority Data

Mar. 5, 1993 [JP] Japan .................................. 5-071234

[51] Int. Cl.⁶ ......................... G11B 17/22; G11B 33/02
[52] U.S. Cl. ................. 369/191; 369/34; 369/36; 369/75.2
[58] Field of Search ........................... 369/34, 36, 37, 369/38, 39, 191–194, 178, 75.2

[56] References Cited

U.S. PATENT DOCUMENTS

| | | | |
|---|---|---|---|
| 4,561,078 | 12/1985 | Nakayama | 369/38 |
| 4,567,584 | 1/1986 | Kawakami | 369/38 |
| 4,653,037 | 3/1987 | Nakayama et al. | 369/38 |
| 4,796,244 | 1/1989 | Tsuruta et al. | 369/38 |
| 4,797,865 | 1/1989 | Imai et al. | 369/39 |
| 4,800,554 | 1/1989 | Yamasaki et al. | 369/291 |
| 4,878,137 | 10/1989 | Yamashita et al. | 360/98.05 |
| 4,949,328 | 8/1990 | Kase et al. | 369/75.2 |
| 4,969,138 | 11/1990 | Ikedo et al. | 369/36 |
| 4,993,008 | 2/1991 | Shiba | 369/3 |
| 5,034,937 | 7/1991 | Caspers et al. | 369/36 |
| 5,062,092 | 10/1991 | Siryj et al. | 369/38 |
| 5,099,466 | 3/1992 | Kimura et al. | 369/36 |
| 5,123,001 | 6/1992 | Nakamichi et al. | 369/36 |
| 5,161,138 | 11/1992 | Caspers et al. | 369/36 |
| 5,173,889 | 12/1992 | Nagashisa et al. | 369/37 |

FOREIGN PATENT DOCUMENTS

| | | | |
|---|---|---|---|
| 0145051 | 6/1985 | European Pat. Off. | 369/258 |
| 389878 | 3/1990 | European Pat. Off. | |
| 3923107 | 1/1991 | European Pat. Off. | |
| 481640 | 4/1991 | European Pat. Off. | |
| 2268308 | 1/1994 | European Pat. Off. | |
| 60-191466 | 9/1985 | Japan | 369/258 |
| 60-217555 | 10/1985 | Japan | 369/258 |
| 62-47893 | 3/1987 | Japan | |
| 62-83254 | 5/1987 | Japan | |
| 63-29258 | 2/1988 | Japan | |
| 63-79273 | 4/1988 | Japan | |
| 63-130950 | 8/1988 | Japan | |
| 63-200354 | 8/1988 | Japan | |
| 63-204548 | 8/1988 | Japan | 369/191 |
| 63-293756 | 11/1988 | Japan | |
| 171338 | 5/1989 | Japan | |
| 150023 | 10/1989 | Japan | |
| 156459 | 11/1989 | Japan | |

(List continued on next page.)

Primary Examiner—Stuart S. Levy
Assistant Examiner—William J. Klimowicz
Attorney, Agent, or Firm—Mark Catan; Alfred W. Froebrich; Thomas R. Morrison

[57] ABSTRACT

A disk player has a magazine for holding disks and mechanisms for transporting disks between four positions, an eject position, a load position, a playback position, and a store position. A disk reader is positioned to read a selected disk in the playback position while the selected disk overlaps disks in the magazine. The disks are held on carriages in the magazine and are transported on the carriages to the disk reader. Each carriage has a V-shaped aperture which provides for access by the disk reader to a recording surface of the selected disk. Clearance for playing the selected disk is also provided by the V-shaped apertures of adjacent carriages in the magazine. The selected disk is raised by the disk reader into an area within the V-shaped aperture of the carriage in the magazine which is above the disk being played. A selected carriage is carried by a tray between the eject position and the load position. The selected carriage is partially removed from the tray during transport from the load position to the playback position. The partial removal elongates an access aperture for the disk reader and allows a shortened tray length to be achieved. The tray has protrusions which extend into the V-shaped aperture and provide supplemental support for a disk held in the selected carriage. Countersunk apertures extend into the protrusions to facilitate removal of a disk from the tray and carriage.

22 Claims, 12 Drawing Sheets

FOREIGN PATENT DOCUMENTS

| | | |
|---|---|---|
| 26542 | 2/1990 | Japan . |
| 26151 | 2/1990 | Japan . |
| 2118956 | 5/1990 | Japan ................................. 369/258 |
| 2143942 | 6/1990 | Japan . |
| 2239462 | 9/1990 | Japan ................................. 369/258 |
| 2260274 | 10/1990 | Japan . |
| 244388 | 11/1990 | Japan . |
| 316126 | 4/1991 | Japan . |
| 3201259 | 9/1991 | Japan . |
| 4114381 | 4/1992 | Japan ................................. 369/258 |
| 424512 | 6/1992 | Japan . |
| 462157 | 10/1992 | Japan . |
| 5020764 | 1/1993 | Japan ................................. 369/178 |
| 5128696 | 5/1993 | Japan ................................. 369/258 |

DISK PLAYER WITH CARRIAGE AND TRAY TRANSPORT MECHANISM

BACKGROUND OF THE INVENTION

The present invention relates to a disk player with a disk transport mechanism, and more particularly, to a disk player having a carriage and tray transport mechanism for transporting a disk from a position outside the disk player to a disk reader within the disk player.

Disk players are available with magazines for holding a plurality disks where the disks in the magazine can be selectively played. This type of disk player is referred to herein as a changer-type player. The magazines of such disk players are often removable from the disk player. When the magazine is mounted in the disk player, a selected disk in the magazine is transported to an optical reader for playing.

Various types of this kind of changer-type player have been proposed and marketed. An example of such a disk player is disclosed is U.S. Pat. No. 5,123,001. The disclosed disk player provides carriages for holding disks which are transported between an ejection, a playback, and a storage position, wherein the storage position locates a selected disk positioned within the magazine. The disks are arranged concentrically within the magazine and the magazine moves in a first direction perpendicular to the disks and relative to a disk reader. Disks are transported in a straight line in a second direction, perpendicular to the first direction, by a disk transport mechanism. Disks in the playback position are completely removed from the magazine by the disk transport mechanism for the purpose of playing. Disks accepted at the eject position are transported on a carriage held by a moving tray to the playback position where the disks are then lifted frown the tray and played.

The above design provides for efficiency in operation and offers the advantage of playing a selected disk or a sequence of disks from the magazine without manual handling. However, the locating of independent eject, playback, and storage positions in a single plane requires a larger depth dimension then is desirable and interferes with producing a compact design. One alternative is to position the magazine to the side of the playback position instead of in-line with the playback position. This alternative however does not permit efficient design of the transport mechanism because transport from the magazine to the playback position is in a different direction than transprt from the playback to the eject position thereby requiring redundant mechanisms which increase the cost of production. Therefore, other design architectures are sought to further reduce the size of the disk player.

OBJECTS AND SUMMARY OF THE INVENTION

Accordingly, it is an object of the present invention to provide a disk player which overcomes the drawbacks of the prior art.

It is a further object of the present invention is to decrease the depth dimension of disk players.

It is a further object of the invention to provide a disk player with a magazine with a reduced depth dimension wherein a disk being played overlaps disks stored in the magazine.

It is a still further object of the invention to provide a disk player having a shorter tray than the prior art such that the tray does not project as far in an eject position.

It is yet another object of the invention to provide a carriage permitting a magazine to remain compact while allowing disks to be played in a position overlapping disks that remain in the magazine.

An object of the present invention is to provide a tray which provides supplemental support for a disk held in a carriage.

Briefly stated, the present invention provides a disk player having a magazine for holding disks and mechanisms for transporting disks between four positions, an eject position, a load position, a playback position, and a store position. A disk reader is positioned to read a selected disk in the playback position while the selected disk overlaps disks in the magazine. The disks are held on carriages in the magazine and are transported on the carriages to the disk reader. Each carriage has a V-shaped aperture which provides for access by the disk reader to a recording surface of the selected disk. Clearance for playing the selected disk is also provided by the V-shaped aperture of an adjacent carriage in the magazine. The selected disk is raised by the disk reader into an area within the V-shaped aperture of the carriage in the magazine which is above the disk being played. A selected carriage is carried by a tray between the eject position and the load position. The selected carriage is partially removed from the tray during transport from the load position to the playback position. The partial removal elongates an access aperture for the disk reader and allows a shortened tray length to be achieved. The tray has protrusions which extend into the V-shaped aperture and provide supplemental support for a disk held in the selected carriage. Countersunk apertures extend into the protrusions to facilitate removal of a disk from the tray and carriage.

In accordance with these and other objects of the invention, there is provided a disk player for playing a disk comprising: a carriage having an area for holding the disk, the carriage defining a first aperture intersecting the area for holding the disk, a tray defining a second aperture, the first and second apertures being joined to form a combined aperture, the tray having means for slidably supporting the carriage within the second aperture, transport means for transporting the tray with the carriage therein between an eject position and a playback position, the transport means including means for at least partly disengaging the carriage from the tray at the playback position, whereby the combined aperture is enlarged, a protruding member on the tray extending into the second aperture to provide supplemental support for the disk at least when the disk is held in the carriage at the eject position.

According to a feature of the invention, the carriage includes a recessed surface having a diameter suitable for accepting the disk, and the protruding member has a surface substantially on a same level as the recessed surface when the carriage is inserted into the tray.

The present invention further includes a feature wherein: the carriage has a second recessed surface, within the recessed surface, having a smaller diameter than the diameter of the recessed surface, and the smaller diameter is suitable for accepting a second type of disk.

According to a further feature of the invention, the protruding member has an arcuate edge substantially conforming to a perimeter of the second type of disk held on the second recessed surface and the carriage is fully inserted in the tray.

According to a still further feature the tray has a front plate with an inside surface, the reading element has a body with a top surface with a front edge, the reading element has a sensing portion, and a distance from the inside surface to the rim of the first aperture is less than a distance from the sensing portion to the front edge of the reading element.

The present invention also provides a disk player for playing a selected disk of a plurality of disks comprising: a magazine for storing the plurality of disks in a plurality of holding slots, carriages, each having an area for holding a disk of the plurality of disks, each of the carriages defining a first aperture coincident with a portion of the area for holding a disk, a tray defining a second aperture, the tray including means for slidably supporting a selected carriage of the carriages within an area of the second aperture, first transport means for transporting the tray with the selected carriage therein between eject position and a load position, a disk reader having a turntable and a reading element for reading a selected disk at the playback position, the disk reader including a means for lifting and clamping the selected disk, second transport means for partially removing the selected carriage from the tray at the load position and transporting the selected carriage to a playback position whereat the selected disk is aligned with the turntable, the first and second apertures converging at the playback position to provide the disk reader with access to a recording surface of the selected disk, the magazine being disposed adjacent to the playback position such that a disk at the selected disk at the playback position overlaps disks in the magazine, the tray having a protruding member extending into the second aperture and providing supplemental support for the selected disk when the selected disk is held in the carriage at the playback position, the second transport means including means for transporting the selected disk from the playback position to a store position coinciding with a selected holding slot of the holding slots, and alignment means for aligning the selected holding slot with the store position.

According to another feature of the present invention the first aperture, of one of the carriages held in a holding slot adjacent to the selected holding slot, provides clearance for the means for lifting to lift the selected disk.

According to yet another feature of the present invention there is provided a disk player comprising: a tray for transporting disks, a disk reader transport means for transporting the tray from an access position outside the disk player to the disk reader within the disk player, the tray having a recessed area for accepting a disk, and the tray including a countersunk aperture extending from an area outside the recessed area to an area within the recessed area.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Referring to FIGS. 1 through FIG. 4, the operation of a disk player 50 of the aforementioned disk player disclosed in U.S. Pat. No. 5,123,001 is illustrated wherein a carriage 53a is transported between eject, playback, and load positions. A disk reader 51, including an optical head and a turntable (both not shown), is mounted within the disk player 50. Toward the back of the disk player 50 is a magazine 52 capable of holding a plurality of carriages 53a–53g on individual levels. An aligning mechanism (not shown) is provided for raising and lowering the magazine 52. The magazine 52 is shown in an empty state without disks in the carriages 53a–53g.

Figure 4:
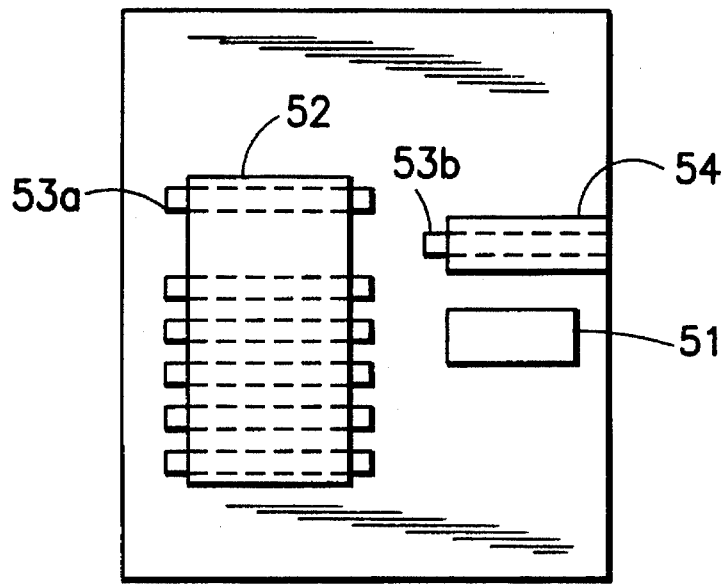
FIG. 4 is a side view drawing of the disk player of FIG. 1 with a carriage from the second level of the magazine shifted to the playback position.
Figure 5:
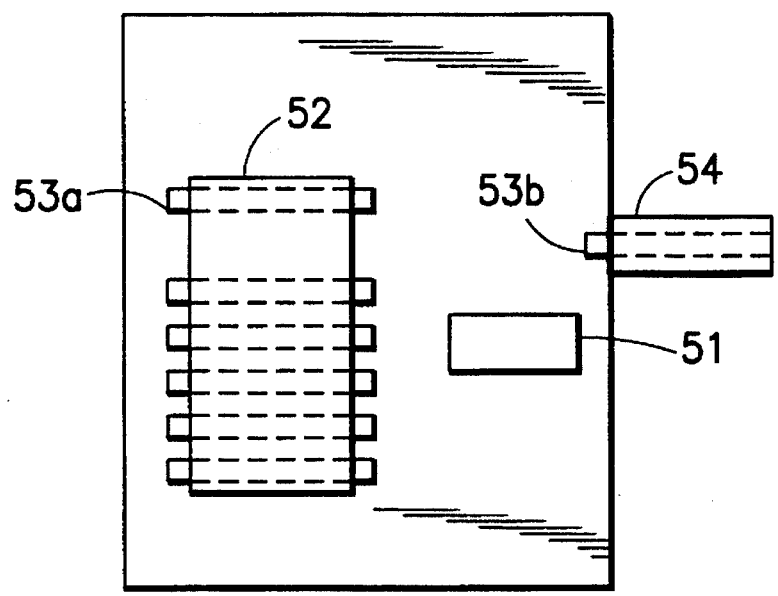
FIG. 5 is a side view drawing of the disk player of FIG. 1 with the carriage and tray at an eject position.

A tray transport mechanism (not shown) moves a tray 54 between the playback position within the disk player 50, as shown in FIGS. 1–4, and the eject position projected from the disk player 50, as shown in FIG. 5. A mechanism (not shown) moves one of carriages 53a–53g from a level in the magazine 52, aligned with the tray 54, into the tray 54 at the playback position. The tray 54 is then moved to carry the carriage from the playback position to the eject position.

Figure 1:
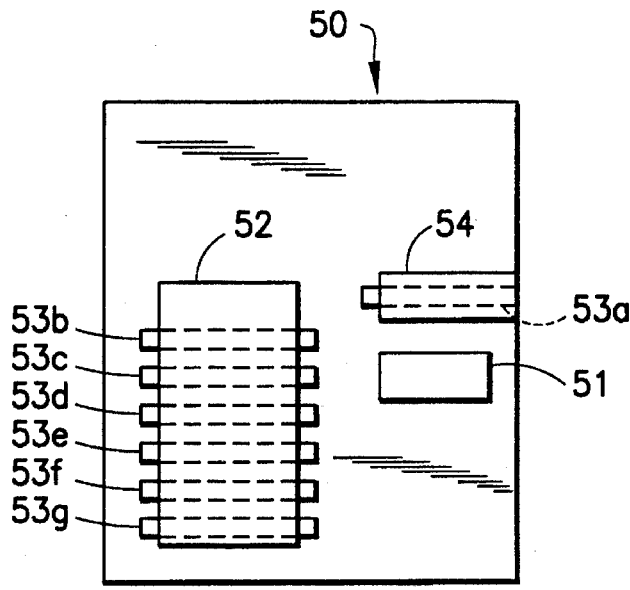
FIG. 1 is a side view drawing of a prior art disk player with a tray and carriage at a playback position.

Referring to FIG. 1, the tray 54 is located within the disk player 50 at the playback position and is holding carriage 53a. At this point, if a disk is held within carriage 53a, the disk can be accepted by the disk reader 51 for playing.

Figure 2:
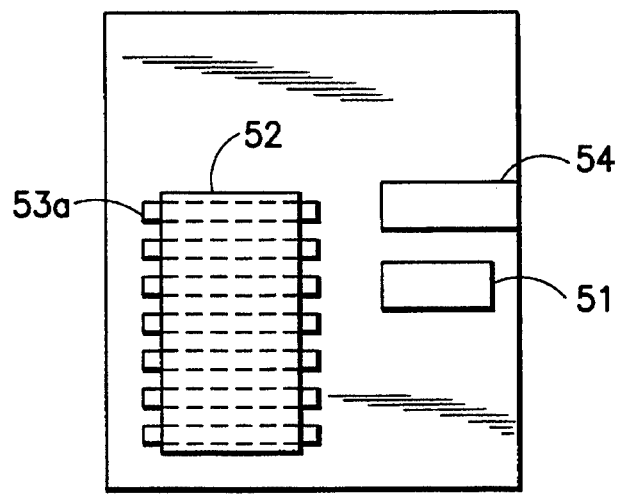
FIG. 2 is a side view drawing of the disk player of FIG. 1 with an empty tray at the playback position.
Figure 3:
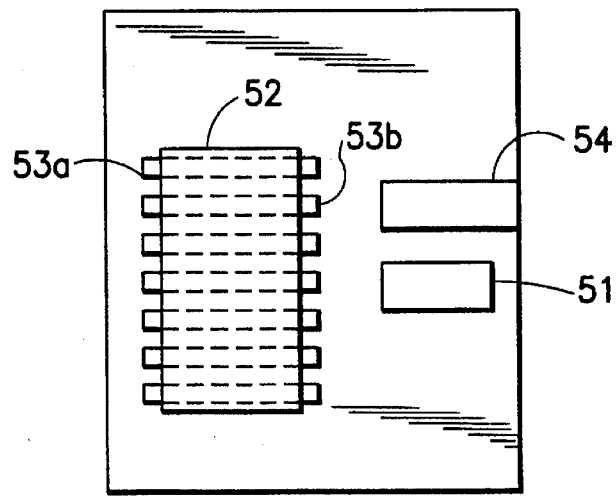
FIG. 3 is a side view drawing of the disk player of FIG. 1 with a magazine shifted to a second level.

The process of storing a disk in the empty magazine 52 in carriage 53b is performed in the following sequence of operations. First, carriage 53a is stored on top most level of the magazine 52, as shown in FIG. 2, by the mechanism for moving the carriages. The magazine 52 is then raised an appropriate distance by the alignment mechanism to align carriage 53b with the tray 54 at the playback position as shown FIG. 3. The carriage 53b is moved into the tray 54 as shown in FIG. 4. Next, in FIG. 5, the tray 54, carrying the carriage 53b is moved to the eject position projecting outside the disk player 50. Once the carriage 53b has been moved to the eject position, a desired disk can be inserted into the carriage 53b. Following the insertion of the disk, the tray 54 is retracted within the disk player 50 to the playback position shown in FIG. 4. The carriage 53b and the disk thereon are then transported into the second level of the magazine 52. By repeating this operation, it is possible to store one disk in each of the carriages 53b–53g.

In this example, carriage 53a is held in the top level of magazine 52 and is always maintained in an empty state within magazine 52. This permits the disk player 50 to operated as in a single-mode player capable of accepting a disk into carriage 53a for playing at all times. Following the playing of the disk, the disk is returned to the eject position for removal and tray 53a is returned to the magazine 52 in an empty state. Changer-type players of the type illustrated by the disk player 50 offer many advantages. These advantages include holding many disks in a magazine, permitting playback of an arbitrary disk from the many disks held in the magazine without the manual effort of exchanging disks, and providing for long-term continuous sequential playing of the disks in the magazine. However, the design presented above requires a large depth dimension due the locating of the eject, playback, and store position in a straight line.

Figure 6:
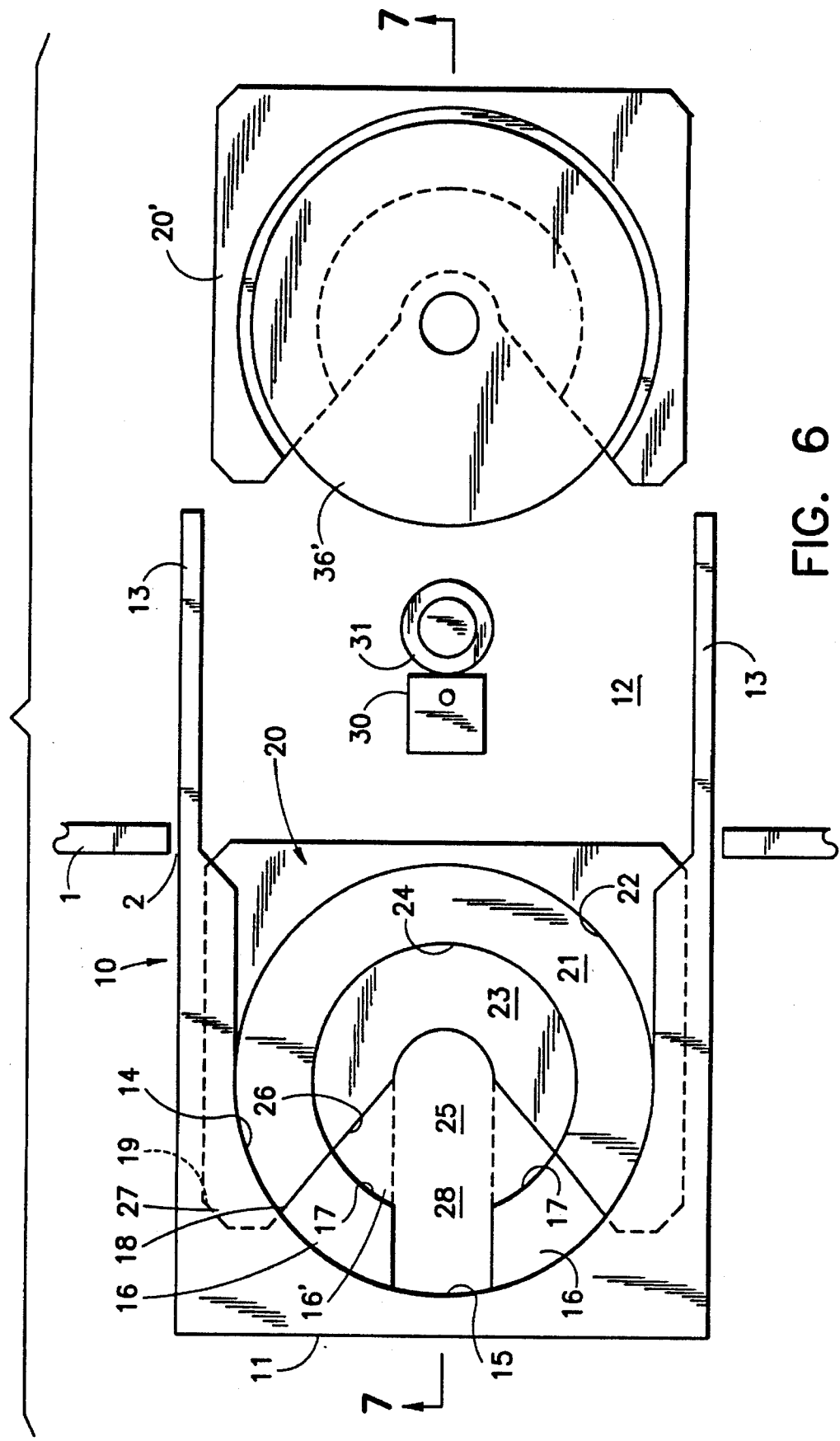
FIG. 6 is a simplified plan drawing showing an embodiment of a disk player of the present invention with a carriage and tray at an eject position.
Figure 7:
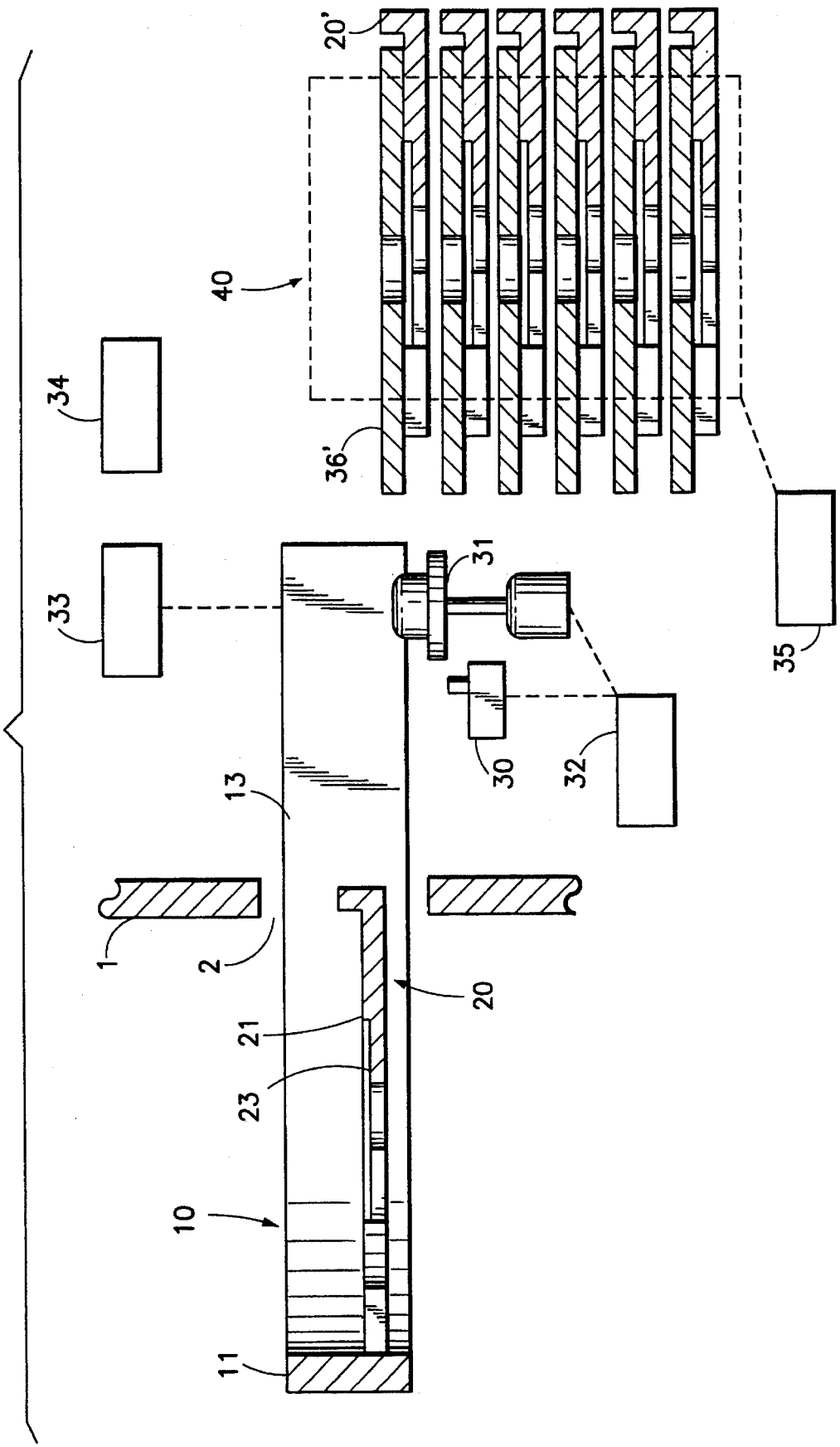
FIG. 7 is a simplified side view cross-section drawing taken along lines VII—VII in FIG. 6.

Referring to FIGS. 6 and 7, a preferred embodiment of a disk player of the present invention is shown with an empty carriage 20 in a tray 10. The tray 10 projects through an aperture 2 in a front panel 1. A front plate 11 of tray 10 substantially corresponds to the size of the aperture 2. The eject position is one of four substantially planar positions to which the carriage 20 is transported. In the eject position the carriage 20 is held fully within a tray 10. In the eject position a disk may either be loaded in the carriage 20 or removed therefrom by the operator of the disk player. The carriage 20 has first and second recesses, 21 and 23, for holding large and small diameter disks (12 cm and 8 cm) respectively. The first and second recesses, 21 and 23, have first and second arcuate edges, 22 and 24. Front edges 26 of the first and second recesses, 21 and 23, define a V-shaped aperture 25 which provides a clearance area to allow overlapping positions as described below. Another carriage 20' is shown holding a disk 36' and is representative of six carriages held within a magazine 40. All carriages, 20 and 20', are of similar design and the operations and characteristics described below with respect to the carriage 20 also apply to each of the other carriages 20'.

Figure 12:
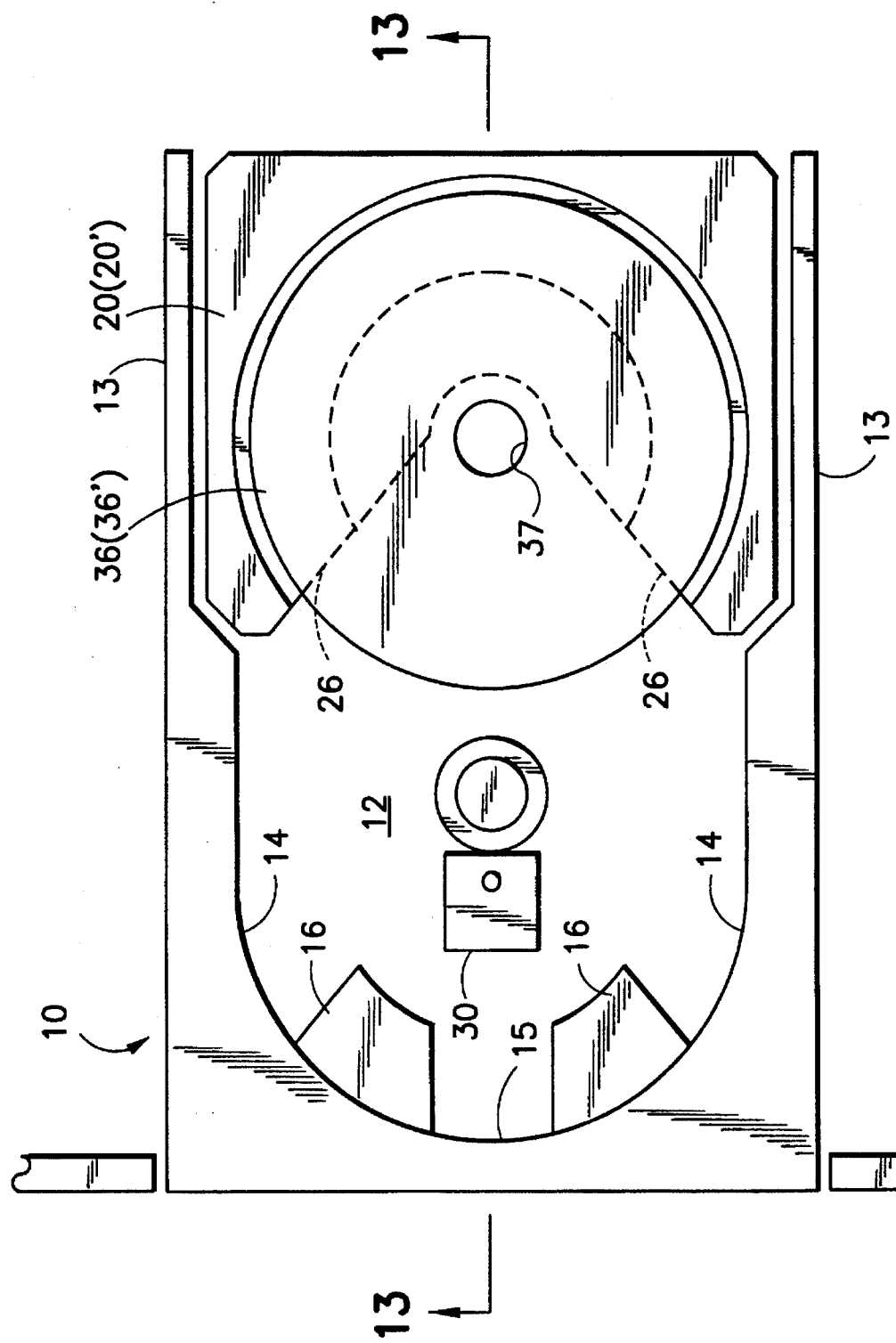
FIG. 12 is a simplified plan view drawing showing the disk player of FIG. 6 in a state where the carriage and disk are at a store position within a magazine.

Referring to FIG. 12, showing the apparatus in the store position so that details can be seen, the tray 10 has a large aperture 12 defined by sides 13 extending horizontally and parallel from both ends of front plate 11, arcuate rims 14, and protrusions 16. The protrusions 16 project into the large aperture 12. Protrusions 16 are formed integrally with the tray 10 between the arcuate rims 14 and the front arcuate rim 15.

Returning now to FIGS. 6 and 7, the arcuate rims 14 and the front arcuate rim 15 form extensions of the first arcuate edge 22 when the carriage 20 fully inserted into the tray 10. Arcuate edges 17 of the protrusions 16 similarly form an extension of the second arcuate edge. The tray 10 has grooves in the arcuate rims 14 and their extensions for the acceptance of edges and front portions 27 of the carriage 20. The carriage 20 is thus slidably supported by the grooves. Linear edges 18 of the protrusions 16 abut front edges 26 of the carriage 20 when the carriage 20 is fully inserted into the tray 10. The protrusions 16 have a surface substantially on the same level as the first recess 21.

The V-shaped aperture 25 eliminates a portion of the carriage 20, and in particular, a disk support surface of the first recess 23. However, the protrusions 16 provide supplemental support for a large diameter disk placed in the first recess 21, permitting nearly the entire perimeter of the large diameter disk to be supported. Therefore, the carriage 20 and the protrusions 16 of the tray 10 provide stable support for holding the large diameter disk. The small diameter disks are adequately supported by the second recess alone, however, the protrusions 16 can be extended in areas 16' (defined by a dashed line) to provide additional support for the small diameter disks if so desired.

The V-shaped aperture 25, defined by the front edges 26 of the carriage 20, fit the outer edges of the protrusions 16 when the carriage 20 is fully inserted into the tray 10. A sufficient distance between the protrusions 16 is provided to allow access to a recording surface of a large diameter disk by an optical reader 30.

A disk reader includes the optical reader 30 and a turntable 31 which are both controlled by a disk reader controller 32. The tray 10 is transported by a tray transport mechanism (not shown) controlled by a tray transport controller 33. The magazine 40 is moved in a direction perpendicular to recording surfaces of the disks 36' by a magazine transport mechanism (not shown) controlled by a magazine transport controller 35. When a selected disk of the disks 36' is to be played or ejected, the magazine transport controller 35 aligns the selected disk with the path of a carriage transport mechanism 134 controlled by the carriage transport controller 34 as is described below.

Figure 8:
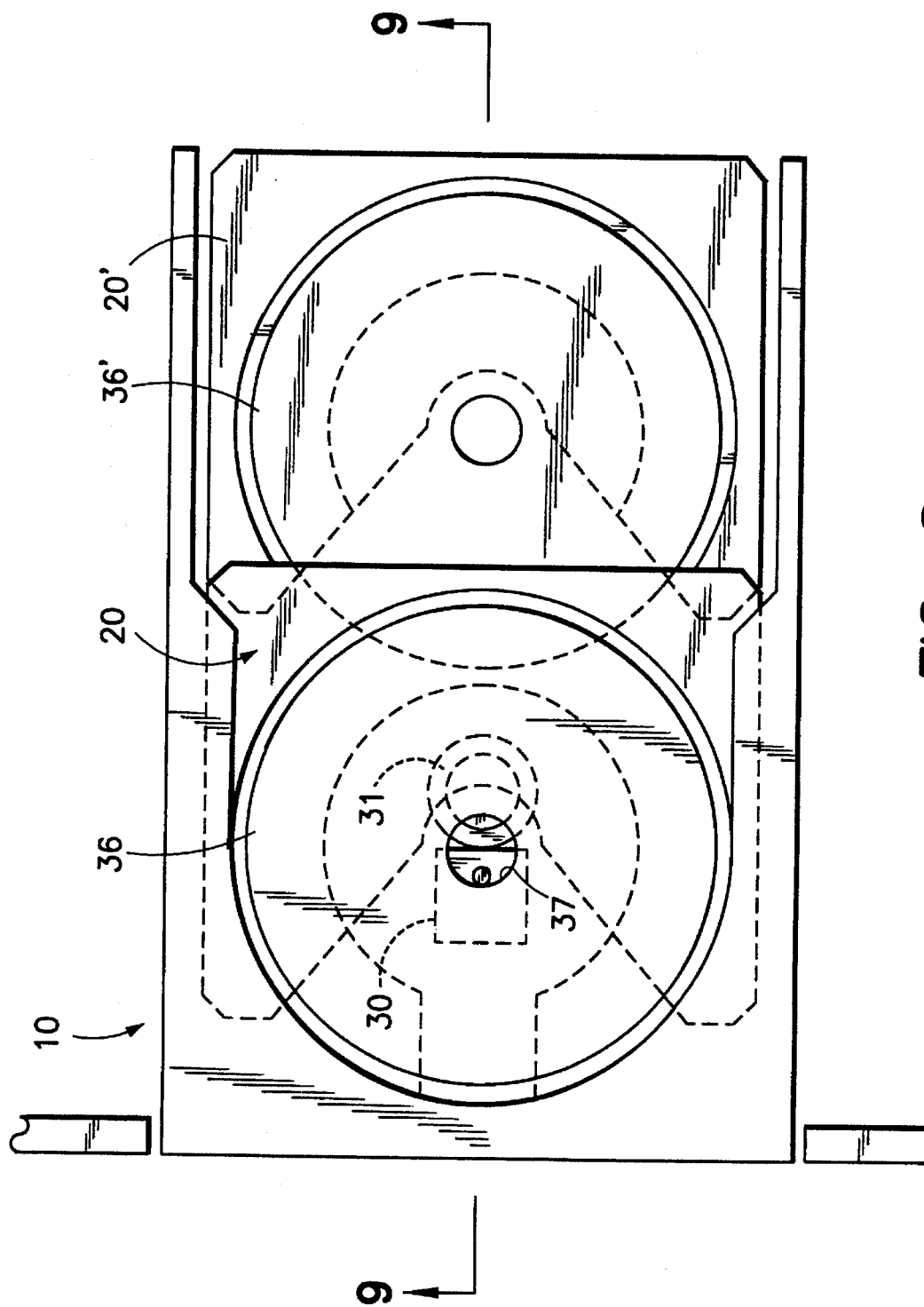
FIG. 8 is a simplified plan drawing of the disk player of FIG. 6 with the tray and carriage at a load position.
Figure 9:
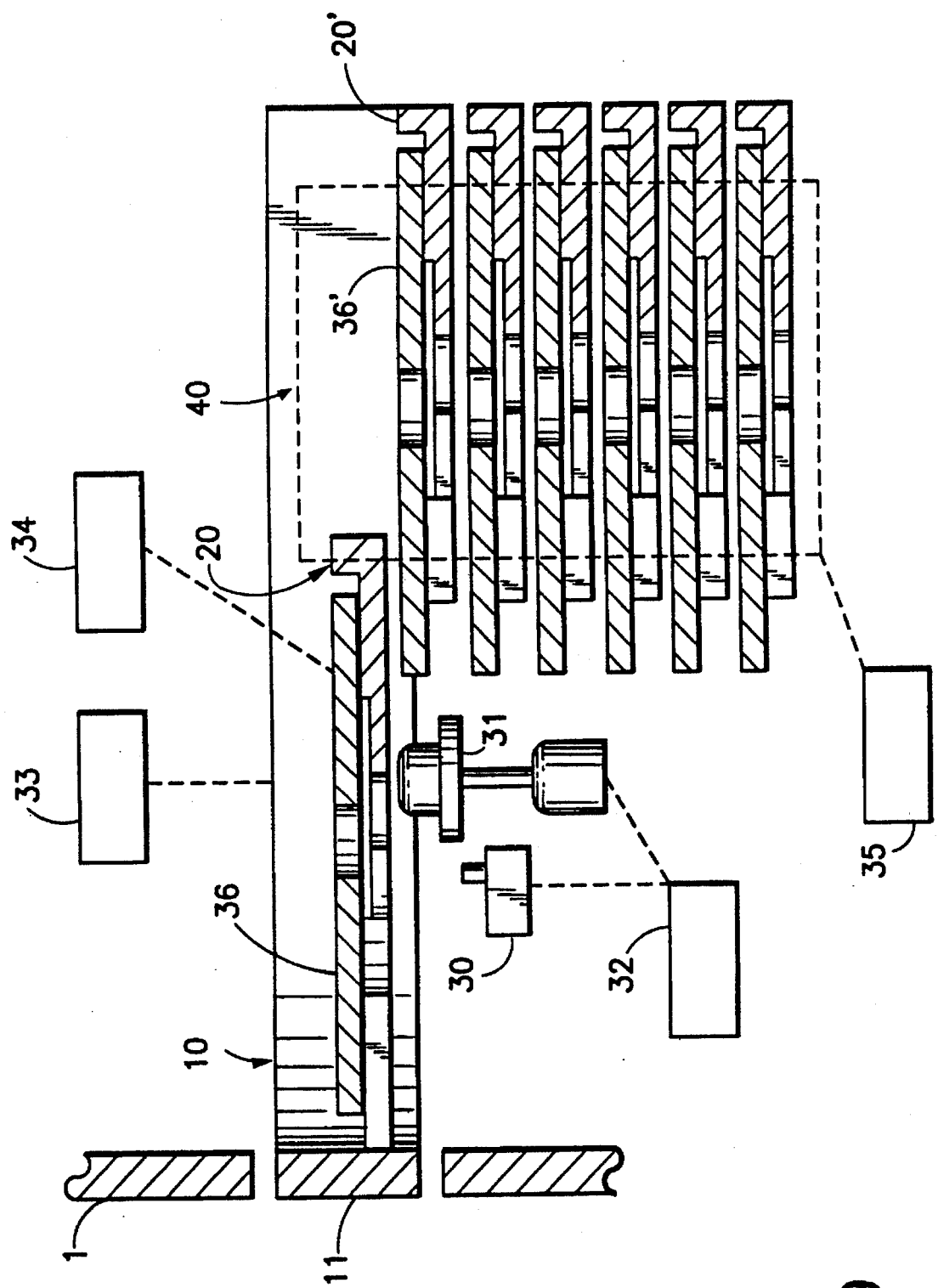
FIG. 9 is a simplified side view cross-section taken along IX—IX in FIG. 8.

Referring to FIGS. 8 and 9, the tray 10 is shown in a second position called the load position. A disk 36 is disposed in tray 10. The tray transport controller 33 operates the tray transport mechanism to move the tray 10, the carriage 20 and the disk 36 from the eject position, shown in FIGS. 6 and 7, to the load position of FIGS. 8 and 9. Once the tray 10 is in the load position, the front plate 11 of the tray 10 substantially closes the aperture 2 flush with the front panel 1. During transport from the eject to load positions, the tray transport mechanism moves the tray 10 and carriage 20 from the eject position to the load position. The carriage transport mechanism 134 performs subsequent movements of the carriage 20, discussed below, while the tray 10 remains stationary in the load position. It will be noted that, in the load position, a center aperture 37 of disk 36 is out of alignment with turntable 31.

Figure 10:
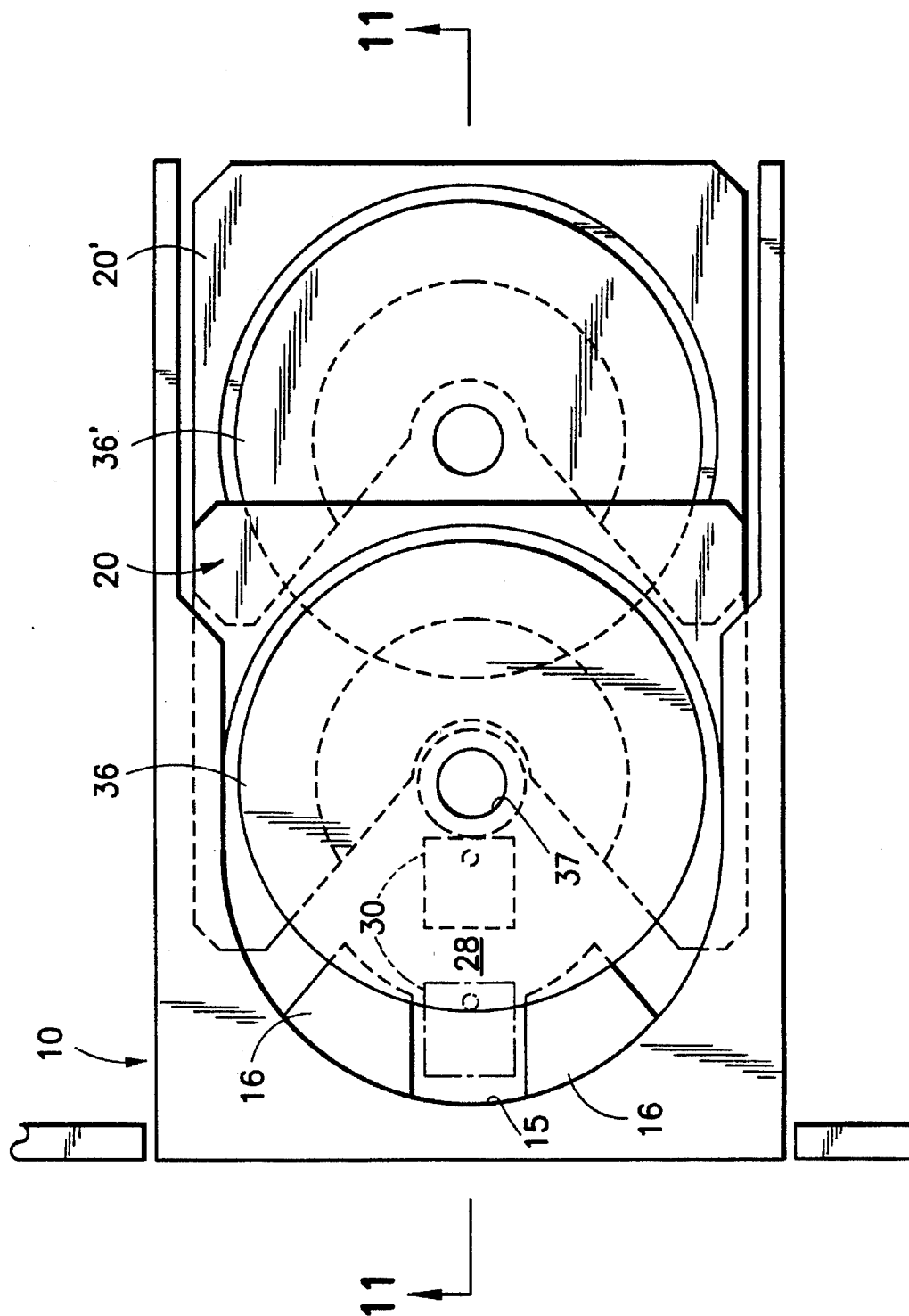
FIG. 10 is a simplified plan view drawing showing the disk player of FIG. 6 in a state where the carriage and a disk are at a playback position.
Figure 11:
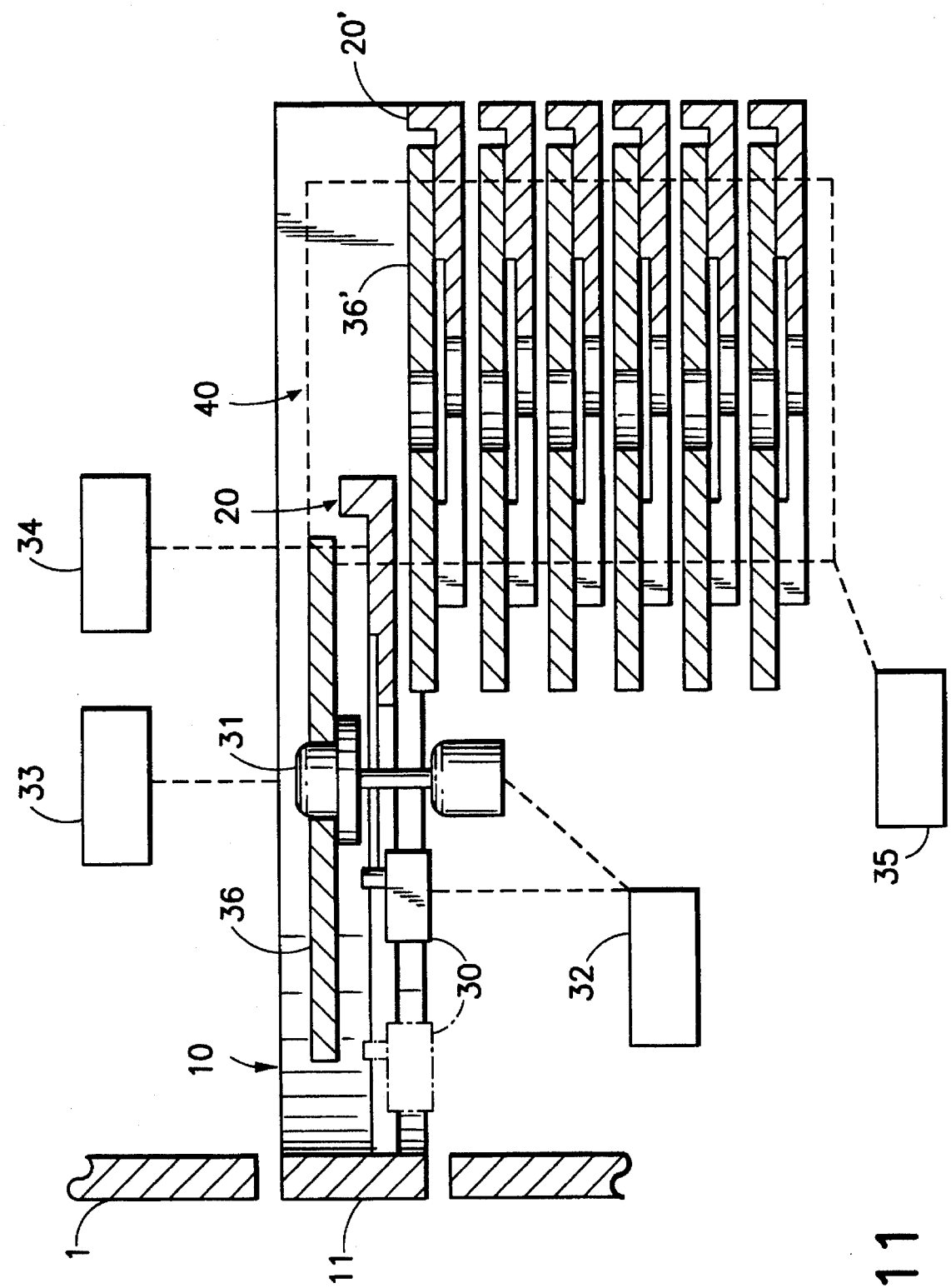
FIG. 11 is a simplified side view cross-section drawing taken along XI—XI in FIG. 10.

Referring to FIGS. 10 and 11, the carriage 20 and disk 36 are shown in a third position called the playback position wherein the center aperture 37 of the disk 36 is aligned with the turntable 31. The disk reader, including the optical reader 30 and turntable 31, is raised to lift the disk 36 from the carriage 20. Raising and lowering the disk reader is performed by a driver mechanism (not shown) controlled by the disk reader controller 32. The turntable 31 clamps the disk 36 against an opposing idler disk (not shown). The carriage 20 is transported from the load position of FIGS. 8 and 9 to the playback position by the carriage transport mechanism 134. The transportation of the carriage 20 partially withdraws the carriage 20 from the tray 10, which remains stationary in the load position, and positions the disk 36 above the turntable 31 so that it may be raised and read.

The operation of playing the disk 36 is initiated by placing the disk 36 in the tray 10 and carriage 20 while the tray 10 and carriage 20 are in the eject position. The operator of the disk player then activates the troy transport controller 33, the carriage transport controller 34, and the disk reader controller 32. The tray transport controller 33 activates the tray transport mechanism to move the tray 10 and carriage 20 to the load position. Then, the carriage transport controller 34 activates the carriage transport mechanism 134 to separate and move the carriage 20 from the tray 10 at the load position to the playback position, while the tray remains stationary. Finally, the disk reader controller 32 activates the disk reader drive mechanism to raise the turntable 31 to lift the disk 36 from the carriage 20 to allow rotation by the turntable 31. The optical reader 30 reads the disk 36 thus accomplishing playing of the disk 36.

The playback position places the disk 36 in a position where the disk 36 overlaps the disks 36' held in the magazine 40. This overlapping arrangement allows the magazine 40 to be positioned closer to the disk reader than in a design where a disk is completely removed from the magazine when being played. In the present design the disk 36 in the playback position partially overlaps an area encompassed by the magazine 40 and the disks 36' therein.

The partial withdrawal of the carriage 20, in the playback position, from the tray 10, at the load position, produces an elongated aperture 28 resulting from an elongation of an aperture defined by the V-shaped aperture 25 and the front arcuate rim 15 of the tray 10. This elongation provides sufficient clearance for the optical reader 30 to travel to a position permitting reading of an outer perimeter of the disk 36 as shown by the dashed outline of the optical reader 30. In the playback position, the carriage 20 remains engaged with and supported by the grooves in the tray 10. While in the playback position, and before the disk reader is raised the disk 36 is supported by both the carriage 20 and the protrusions 16.

The optical reader 30 moves linearly in a radial direction of the disk 36 to read recorded information accessible through elongated aperture 28. The elongated aperture 28, produced by transport of the carriage 20 to the playback position, is required to allow the optical reader 30 to read an outer perimeter of the disk 36. When the disk 36 is in the load position as shown in FIGS. 8 and 9, and the carriage 20 is fully inserted in the tray 10, the outer perimeter of the disk 36 is too close to the front plate 11 of the tray 10 to allow for clearance for the optical reader 30 to read the outer perimeter of the disk 36. When the disk 36 is displaced to the playback position its outer perimeter is moved away from a front of the tray 10 to provide clearance for the disk reader 30 in the elongated aperture 28.

An alternative design involves positioning the front of the tray further from the front arcuate rim 15 to provide additional clearance. This solution results in an undesirable lengthening of the tray 10 which would result in the tray 10 extending further from the front panel 1 when in the eject position. Additionally, the lengthening of the tray 10 would also require that the depth of the disk player be increased accordingly.

When the playing of the disk 36, shown supported by the turntable 31 in FIG. 11, is completed, the disk reader drive controller 32 lowers turntable 31 until the disk 36 is again supported on the carriage 20. Storage of the disk 36 is performed automatically or is initiated by the operator operating an appropriate control.

For storage, tray 10 remains stationary while tray transport controller 33 moves carriage 20 toward, and into, magazine 40.

Figure 13:
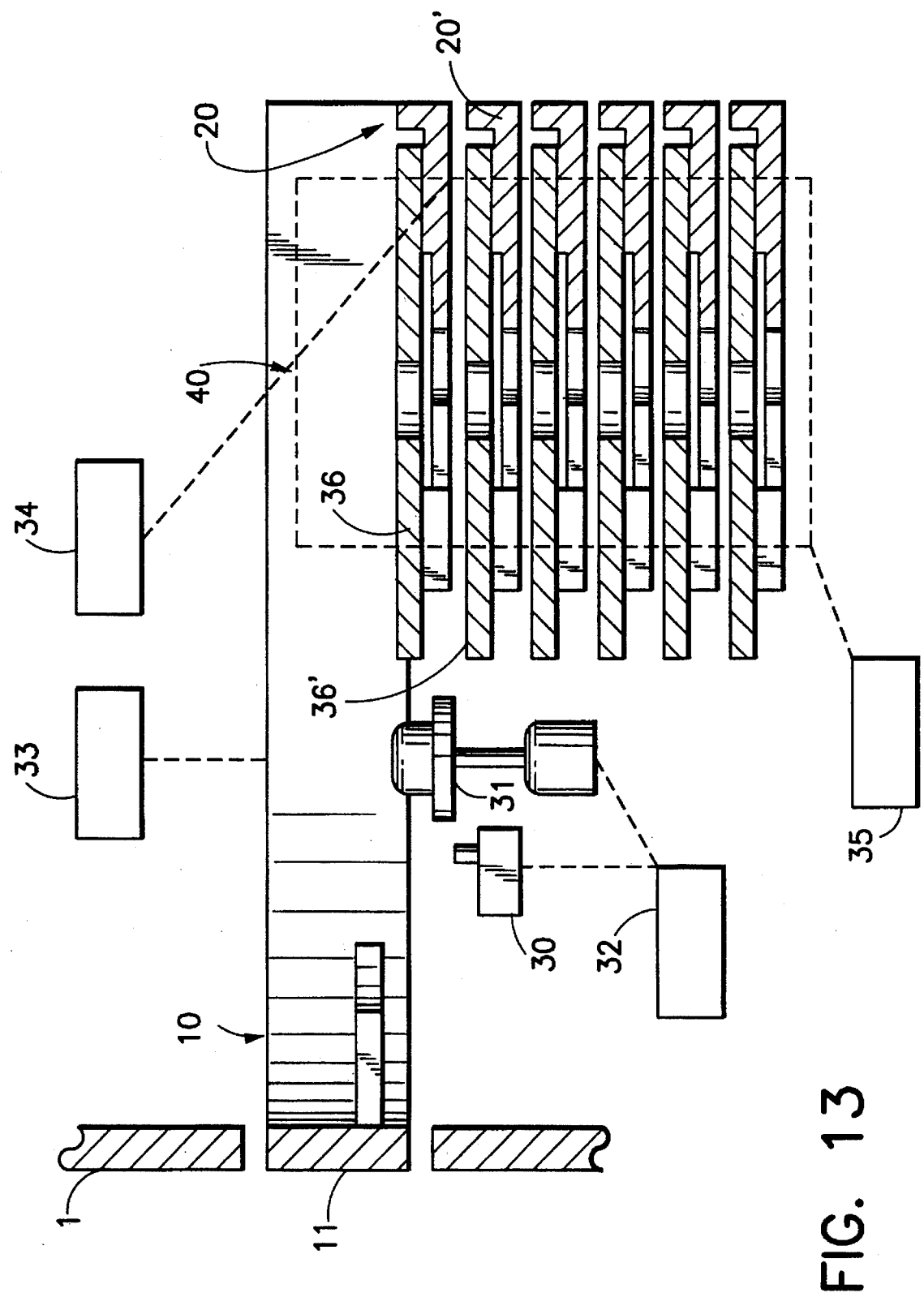
FIG. 13 is a simplified side view cross-section drawing taken along line XIII—XIII in FIG. 12.

Referring now to FIGS. 12 and 13, the carriage 20 and disk 36 are shown in a fourth position called the store position. The carriage 20 is transported to the store position by the carriage transport mechanism 134 which inserts the carriage 20 into the magazine 40. Once in the store position the disk 36 is within the magazine 40. The carriage 20 is totally disengaged from the grooves of the tray 10 and the magazine 40 is free to be raised or lowered by the magazine transport mechanism.

In FIG. 13, the disk 36 is stored on a top level of the magazine 40. However, the magazine 40 can be raised and lowered as discussed above to permit storage in or selection from an arbitrary level in the magazine 40. For example, once disk 36 is stored in the top level, the magazine 40 can be raised so that a second level, holding a selected one of the disks 36' in the magazine 40, is brought into alignment with the carriage transport mechanism 134. The magazine transport controller operated the magazine transport mechanism in response to the actuation of an appropriate control (not shown) on the front panel of the disk for the selection of the desired level. Once the desired level is aligned with the carriage transport mechanism, a disk therein can be transport for playing or ejection. Similarly, an empty carriage can be transported to the eject position for the acceptance of a disk for playing or storing.

The V-shaped aperture 25 of the carriages, 20 and 20', permits the playing of disks from levels other than the top level of the magazine 40. The V-shaped aperture 25 of one of the carriages, 20 and 20', which is on a level in the magazine above a level of a disk to be played, provides clearance the disk to be raised by the turntable 31. For example, if one of the carriages 20', holds a selected disk on the second level, the magazine transport mechanism is operated to align the selected carriage on the second level with the carriage transport mechanism 134. The selected carriage is then transported directly to the playback position, without first going to the load position. In the playback position the selected disk thereon overlaps the other disks 36' remaining in the magazine. Additionally, the selected disk extends beneath the disk 36 in the top level of the magazine. The turntable 31 raises the selected disk into a clearance area provided by the V-shaped aperture 25 of the carriage 20 on the top level. The V-shaped aperture 25 provides clearance allowing the selected disk to be played and eliminates the need to space the levels in the magazine 40 further apart. Therefore, the V-shaped aperture 25 of the carriages, 20 and 20', permits a reduction in the depth of the disk player by allowing the disks, 36 and 36', to be played while overlapping other disks, 36 and 36', in the magazine 40, and a compact size of the magazine 40 to be achieved.

In some applications, it may simplify control of the apparatus if every operation of moving a disk to or from the playback position goes through the load position. That is, a disk 36 being removed from the magazine 40 moves first to the load position, and then is returned to the playback position. Also, a disk being returned from the playback position to the magazine moves first to the load position, and then to the magazine 40. In another embodiment, disk 36 may be moved from the magazine 40 directly into rough alignment with the turntable 31, and then finally aligned with the turntable.

Figure 14:
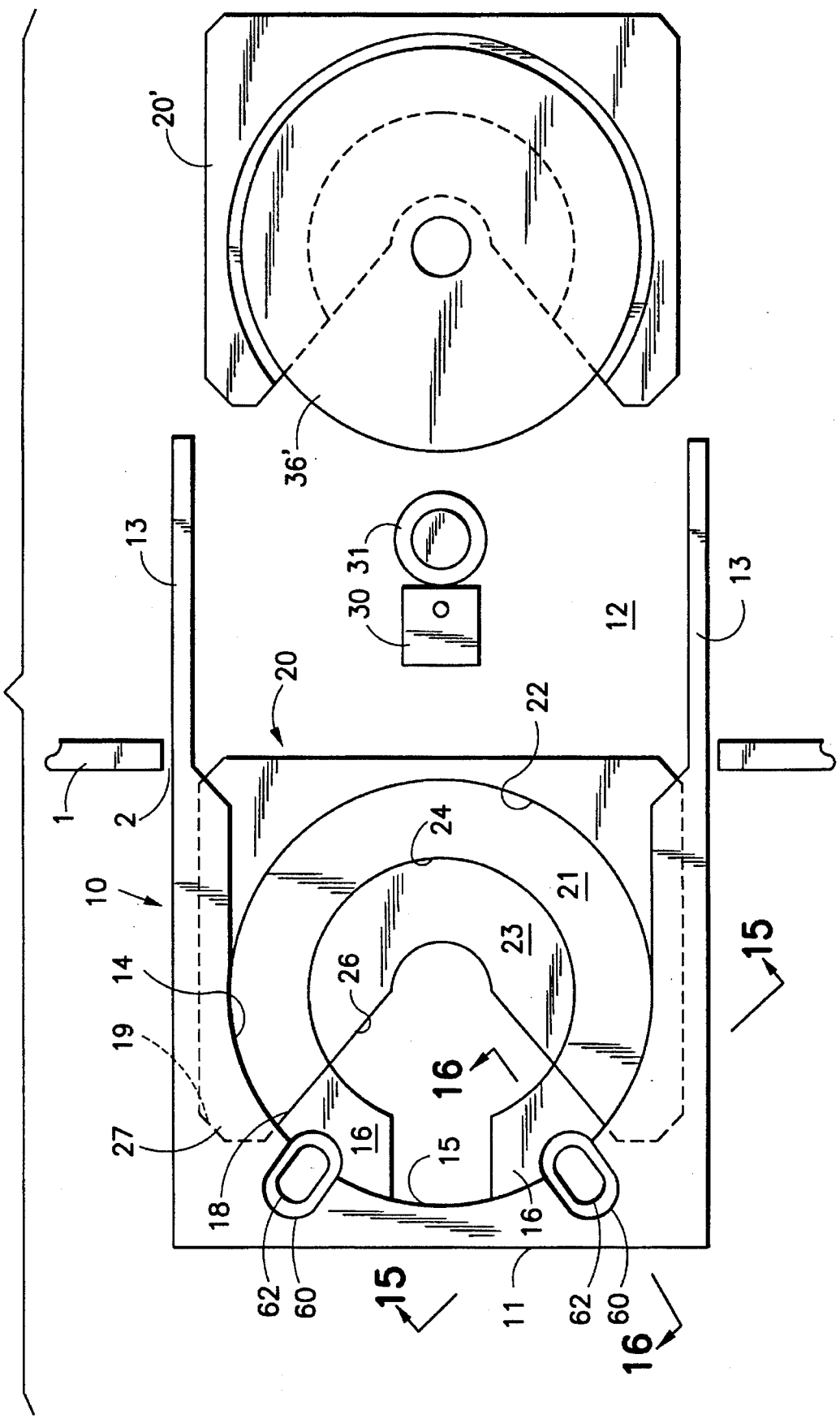
FIG. 14 is a simplified plan drawing showing another embodiment of a disk player of the present invention with a carriage and tray at an eject position.
Figure 15:
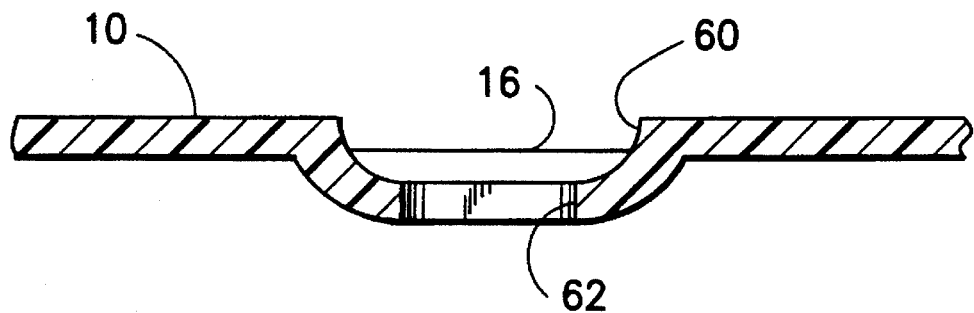
FIG. 15 is a side view cross-section drawing taken along line XV—XV in FIG. 14.
Figure 16:
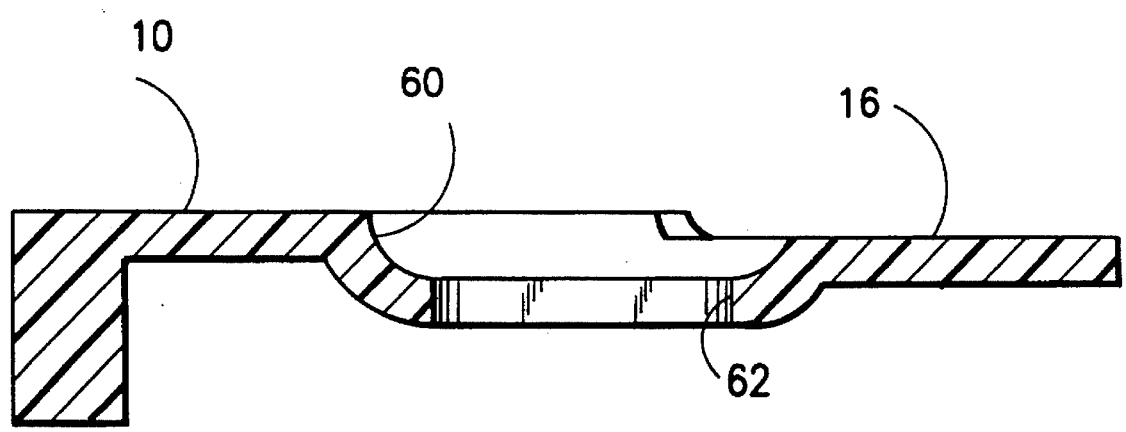
FIG. 16 is a side view cross-section drawing taken along line XVI—XVI in FIG. 14.

Referring to FIGS. 14, 15, and 16, another embodiment of the present invention is shown which is similar to the above embodiment except with regard to the features discussed below. The tray 10 has countersunk apertures 62 which extend into the protrusions 16 from corner areas of the tray 10. The countersunk apertures 62 are countersunk by recessed portions 60 which have a curved shape. The recessed portions 60 and the countersunk apertures 62 permit an operator to easily remove a disk (not shown) held in the first recess 21. A fingertip may be inserted within one of the countersunk apertures 62 to reach beneath the disk and lift the disk from the tray. The countersunk apertures 62 project a short distance beneath the disk and thus limit fingertip contact with the disk to an area on a perimeter of the disk. The limiting of the contact area prevents residue from the fingertip from interfering with an area on the surface of the disk where information is recorded. Therefore, the countersunk apertures 62 permit the disk to be easily remove without degrading the recording surface.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk player for playing a disk comprising:

a carriage having an area for holding said disk;

said carriage defining a first aperture intersecting said area for holding said disk;

a tray defining a second aperture;

said tray having means for slidably supporting said carriage within said second aperture;

said first and second apertures being joined to form a combined aperture when said carriage is supported within said second aperture of said tray;

transport means for transporting said tray with said carriage therein between an eject position outside said disk player and a load position within said disk player;

said transport means including means for at least partly disengaging said carriage from said tray, when said tray is at said load position, and sliding said carriage with respect to said tray, with said disk held in said carriage, to a playback position, such that said combined aperture is enlarged;

a protruding member on said tray extending into said second aperture to provide supplemental support for said disk at least when said disk is held in said carriage at said eject position.

2. The disk player according to claim 1 wherein said second aperture has a rim substantially conforming to a portion of a perimeter of said disk when said disk is held in said carriage and said carriage is fully inserted into said tray at said load position.

3. The disk player according to claim 1 wherein:

said carriage includes a recessed surface having a diameter suitable for accepting said disk; and said protruding member has a surface substantially on a same level as said recessed surface when said carriage is inserted into said tray.

4. The disk player according to claim 3 wherein:

said carriage has a second recessed surface, within said recessed surface, having a smaller diameter than said diameter of said recessed surface; and said smaller diameter is suitable for accepting a second type of disk.

5. The disk player according to claim 4 wherein said protruding member has an arcuate edge substantially conforming to a perimeter of said second type of disk held on said second recessed surface when said carriage is fully inserted in said tray.

6. The disk player of claim 5 wherein:

said first aperture is defined by an inward edge of said carriage;

said protruding member has a side edge;

and at least a portion of said side edge abuts at least a portion of said inward edge of said first aperture of said carriage when said carriage is fully inserted in said tray.

7. The disk player of claim 6, further comprising:

said tray having a front plate with an inside surface;

a reading element at said playback position;

said reading element having a body with a top surface with a front edge;

said reading element having a sensing portion;

said second aperture having a rim substantially conforming to a portion of a perimeter of said disk when said disk is held in said carriage; and a distance from said inside surface to said rim of said second aperture being less than a distance from said sensing portion to said front edge of said reading element.

8. The disk player according to claim 4 wherein said protruding member has a second surface substantially on a same level as said second recessed surface when said carriage is inserted into said tray.

9. The disk player of claim 2, further comprising:

said tray having a front plate with an inside surface;

a reading element at said playback position having a body with a top surface with a front edge;

said reading element having a sensing portion in said top surface; and a distance from said inside surface to said rim of said second aperture being less than a distance from said sensing portion to said front edge of said reading element.

10. The disk player of claim 9 wherein:

said disk has a recording surface, on which information can be recorded;

said recording surface having an outermost edge;

a distance from an outermost edge of said recording surface to said inside surface of said front plate is greater than said distance from said sensing portion to said front edge of said reading element when said disk is in said carriage at said playback position.

11. The disk player of claim 1 further comprising:

a magazine for storing disks in a plurality of holding locations;

a second transport means including means for transporting a disk from said playback position to a store position coinciding with a selected one of said holding locations; and alignment means for aligning a selected holding location with said store position.

12. The disk player of claim 1 wherein:

said first aperture is defined by an inward edge of said carriage;

said protruding member has a side edge;

and at least a portion of said side edge abuts at least a portion of said inward edge of said first aperture of said carriage when said carriage is fully inserted in said tray.

13. A disk player for playing a selected disk of a plurality of disks comprising:

a magazine for storing said plurality of disks in a plurality of holding locations;

carriages, each having an area for holding a disk of said plurality of disks;

each of said carriages defining a first aperture coincident with a portion of said area for holding a disk;

a tray defining a second aperture;

said tray including means for slidably supporting a selected carriage of said carriages within said second aperture;

first transport means for transporting said tray with said selected carriage therein between an eject position and a load position;

a disk reader having a turntable and a reading element for reading said selected disk at a playback position;

said disk reader including a means for clamping and rotating said selected disk;

said first aperture of said selected carriage having a first border defining said first aperture;

said second aperture of said tray having a second border defining said second aperture;

said first and second apertures being joined to form a combined aperture defined by at least a portion of said first border and at least a portion of said second border when said selected carriage is supported within said second aperture of said tray;

second transport means for partially removing said selected carriage from said tray at said load position and transporting said selected carriage to said playback position whereat said selected disk is aligned with said turntable;

said partially removing being a sliding of said selected carriage with respect to said tray in a direction such as to cause said combined aperture to elongate to provide said disk reader with access to a recording surface of said selected disk;

said magazine being disposed adjacent to said playback position such that a disk at said playback position overlaps locations for disks in said magazine;

a protruding member on said tray extending into said second aperture and providing supplemental support for said selected disk when said selected disk is held in said carriage at said eject position;

said second transport means including means for transporting said selected disk from said playback position to a store position coinciding with a selected holding location of said holding locations; and alignment means for aligning said selected holding location with said playback position.

14. The disk player according to claim 13, wherein said first aperture, of one of said carriages held in another holding location adjacent to said selected holding location, provides clearance for clamping said selected disk.

15. The disk player according to claim 13 wherein said second aperture has a rim substantially conforming to a portion of a perimeter of said selected disk held in said selected carriage inserted in said tray at said load position.

16. The disk player of claim 15 wherein:

said tray has a front plate with an inside surface;

said reading element has a body with a top surface with a front edge;

said reading element has a sensing portion; and a distance from said inside surface to said rim of said second aperture is less than a distance from said sensing portion to said front edge of said body.

17. The disk player according to claim 13 wherein:

each of said carriages includes a recessed surface having a diameter suitable for accepting said disk; and said protruding member has a surface substantially on a same level as said recessed surface of said selected carriage inserted in said tray.

18. The disk player according to claim 17 wherein:

at least one of said carriages has a second recessed surface within said recessed surface;

said second recessed surface has a smaller diameter than said diameter of said recessed surface; and said smaller diameter is suitable for accepting a second type of disk.

19. The disk player according to claim 18 wherein said protruding member has an arcuate edge substantially conforming to a portion of a perimeter of said second type of disk when said disk is held on said second recessed surface of said selected carriage fully inserted in said tray.

20. The disk player of claim 13 wherein:

said first aperture is defined by an inward edge of said carriage;

said protruding member has a side edge;

and at least a portion of said side edge abuts at least a portion of said inward edge of said first aperture of said carriage fully inserted in said tray.

21. A disk player according to claim 13, wherein:

said eject position is outside said disk player; and said load position is within said disk player.

22. A disk player according to claim 13, wherein said second transport means transports said selected carriage in a direction parallel to said recording surface of said disk held on said selected carriage when said tray is stationary in said load position.

* * * * *